United States Patent [19]

Villasenor de Rivas

[11] 4,006,401
[45] Feb. 1, 1977

[54] ELECTROMAGNETIC GENERATOR

[75] Inventor: Eduardo Villasenor de Rivas, Los Angeles, Calif.

[73] Assignee: Rene Villasenor de Rivas, Los Angeles, Calif.

[22] Filed: Dec. 12, 1975

[21] Appl. No.: 640,064

[52] U.S. Cl. .................. 323/92; 307/104; 336/110
[51] Int. Cl.² ........................... G05F 7/00
[58] Field of Search .............. 307/101, 104, 106; 323/75 S, 75 R, 89 C, 92; 324/34 PE, 34 PL, 48; 336/110

[56] References Cited
UNITED STATES PATENTS

| | | | |
|---|---|---|---|
| 2,725,520 | 11/1955 | Woodworth | 323/92 X |
| 2,802,170 | 8/1957 | Starr et al. | 323/92 |
| 2,866,943 | 12/1958 | Ringelman | 323/92 X |
| 2,885,624 | 5/1959 | Belsey et al. | 323/92 X |
| 2,976,478 | 3/1961 | Aske | 323/89 C |
| 3,368,141 | 2/1968 | Garron | 323/92 X |

*Primary Examiner*—A. D. Pellinen
*Attorney, Agent, or Firm*—Harris, Kern, Wallen & Tinsley

[57] ABSTRACT

An electromagnetic generator including a permanent magnet and a core member wherein the direction of magnetic flux flowing from the magnet in the core member is rapidly alternated by switching to generate an alternating current in a winding on the core member.

4 Claims, 7 Drawing Figures

U.S. Patent  Feb. 1, 1977  4,006,401
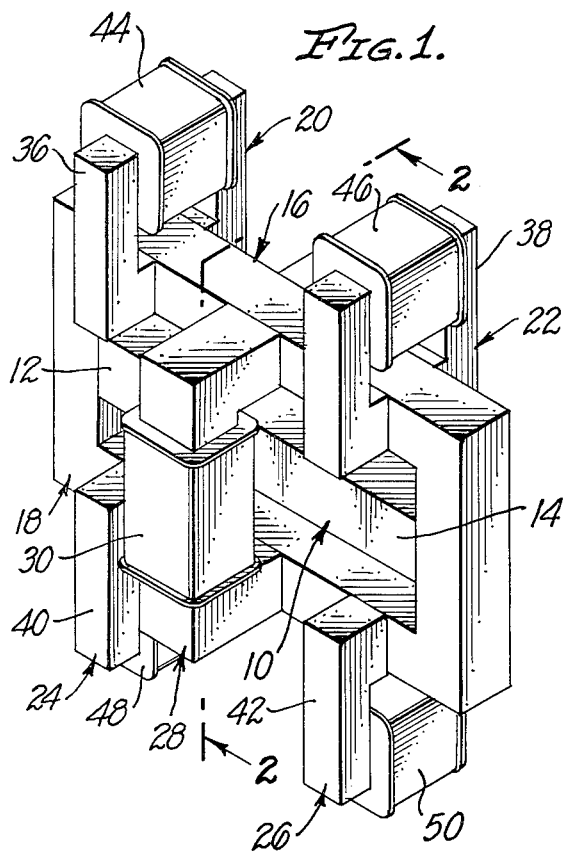
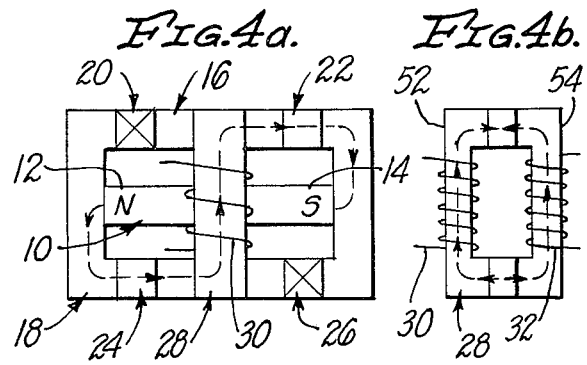
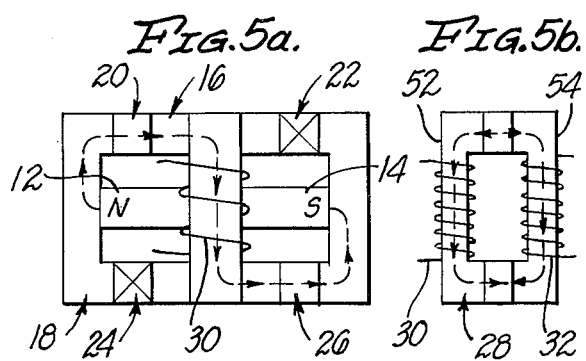
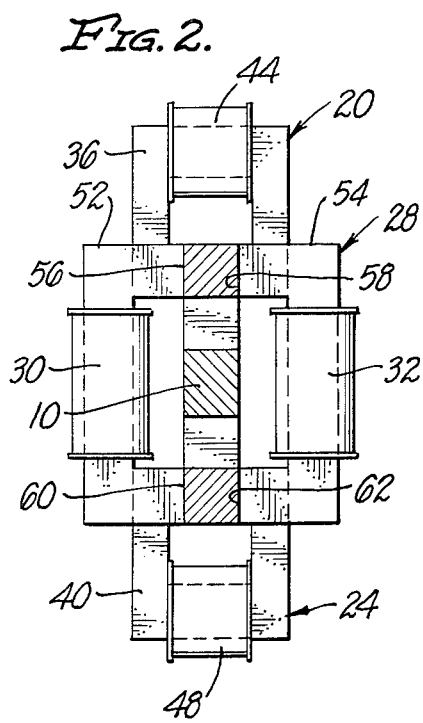
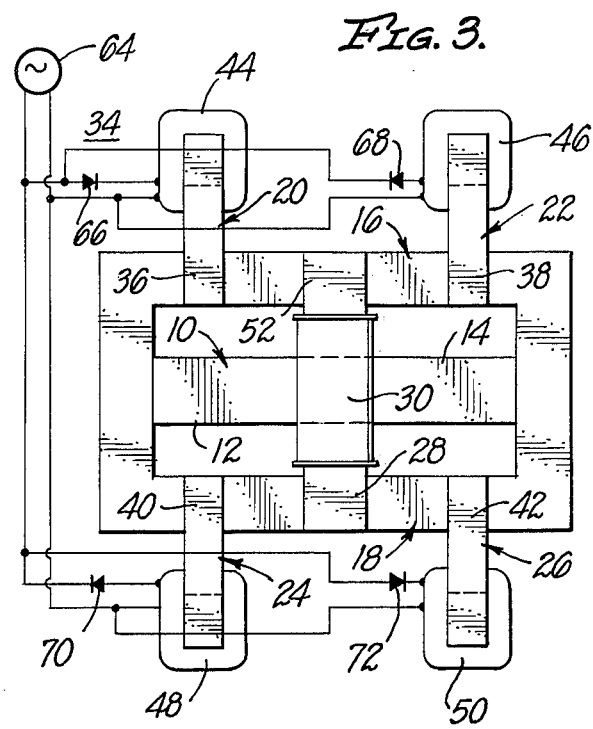

ELECTROMAGNETIC GENERATOR

The present invention relates to apparatus for generating electrical energy from magnetic energy and, more particularly, to a low cost electromagnetic generator wherein the direction of magnetic flux from a permanent magnet and flowing in a core member is rapidly alternated to generate an alternating current in a winding on the core member.

Permanent magnets have long been recognized and used as sources of magnetic flux both separately and in combination with electromagnets as means of intensifying current flow. In such instances, as the frequency of the control signal to the electromagnet has increased, so has the coil inductance of the electromagnet and the effective reluctance of the magnetic flux path to limit the magnitude of the generated current.

It is an object of the present invention to provide an electromagnetic generator including a permanent magnet as a flux source wherein the magnitude of the generated current increases as a function of the frequency of the signals applied to control the direction of flux flow from the magnet.

Another object of the present invention is to provide a low cost electromagnetic generator including a permanent magnet and a core member in combination wherein the direction of magnetic flux flowing from the magnet in the core member is rapidly alternated by switching means to generate an alternating current in a winding on the core member.

A further object of the present invention is to provide an electromagnetic generator including a permanent magnet and two separate magnetic flux circuit paths between the north and south poles of the magnet each including switching means for opening and closing the flux circuits in combination with a core member and means for alternately operating the switching means such that the direction of magnetic flux in the core member is rapidly alternated to generate an alternating current in a winding on the core member.

Still another object of the present invention is to provide an electromagnetic generator of the foregoing character wherein the switching means includes means for saturating regions of the magnetic flux paths in directions substantially normal to the direction of flux flow from the permanent magnet to selectively block such flux flow and effectively open the magnetic flux circuits.

The foregoing as well as other objects and features of the present invention may be more clearly understood by reference to the following detailed description when considered with the drawing which, by way of example only illustrates one form of electromagnetic generator including the features of the present invention.

In the drawing:

FIG. 1 is a perspective view of the an electromagnetic generator constructed in accordance with the present invention;

FIG. 2 is a sectional side view of the electromagnetic generator taken along the line 2—2 in FIG. 1;

FIG. 3 is a front view of the electromagnetic generator of FIG. 1, including a diagrammatic representation of the circuitry for applying a high-frequency, low magnitude control signal to the electromagnetic generator to rapidly alternate the direction of magnetic flux flow from a permanent magnet in a core member to produce a relatively high magnitude alternating current in windings on the core member;

FIGS. 4(a) and 4(b) are front and side views respectively of the electromagnetic generator diagrammatically representing the condition of the generator during a first half-cycle of the control signal to cause magnetic flux from the permanent magnet to flow in a first direction through a core member; and FIGS. 5(a) and 5(b) are front and side views similar to FIGS. 4(a) and 4(b) diagrammatically representing the condition of the electromagnetic generator during a second half cycle of the control signal to cause magnetic flux from a permanent magnet to flow in an opposite direction in the core member.

Generally speaking, the electromagnetic generator of the present invention comprises a strong permanent magnet 10 having a north pole 12 and a south pole 14. Connecting the north and south poles of the permanent magnet are two magnetic flux circuit means or paths 16 and 18. The magnetic flux path 16 includes first and second switching means 20 and 22 for opening and closing the magnetic flux path 16 while the magnetic flux path 18 inncludes first and second switching means 24 and 26 for functioning in a similar manner relative to the second magnetic flux path. Intersecting the flux paths 16 and 18 and connected thereto between the first and second switching means 20 and 22 and 24 and 26, respectively, is a core member 28 of highly permeable material carrying windings 30 and 32 of electrically conductive material for connecting to an external load circuit.

Normally, magnetic flux from the north pole 12 of the permanent magnet 10 will divide and flow simultaneously through the magnetic flux paths 16 and 18 to the south pole 14. In operation of the present invention, however, electric circuit means 34 functions to alternately operate the switching means 20 and 26 and the switching means 22 and 24 to selectively open and close segments of the flux paths 16 and 18 such that the direction of magnetic flux from the permanent magnet 10 is alternated in flowing in the core member 28 to generate an alternating current in the windings 30 and 32 for application to an external load circuit.

Preferably, the switching means are capable of operating in response to a low magnitude, high frequency control signal to produce a high frequency alternation in the direction of flux flow in the core member to generate a relatively high magnitude alternating current: the magnitude of the alternating current being a function of the rate of change of the direction of flux flow in the core member.

More particularly, in the illustrated form of the present invention, the permanent magnet 10 is a bar magnet while the two magnetic flux paths 16 and 18 comprise a member of highly permeable material formed as a closed loop external to and between the north and south poles 12 and 14. While such a member is illustrated in FIG. 1 as being a single piece member, it is appreciated that the member may be segmented as desired.

In the present invention, various forms of switching means may be employed. Of course, for a very low frequency generator, segments of the highly permeable member comprising the flux paths 16 and 18 may form the switching means in combination with means for mechanically or manually moving the segments from the member to open the flux paths on a selective basis.

Preferably, for high frequency operations, the switching means each include means for cross-saturating a region of the highly permeable member substantially normal to the direction of flux flow from the magnet 10. Such saturation immediately increases the reluctance of the flux path to effectively open the associated magnetic flux path in the region of the actuated switching means.

One form of such a cross-saturating mechanism is illustrated in the drawing for each switching means and comprises a horseshoe-shaped core with ends on opposite sides of the highly permeable member and carrying a low inductance coil. For the switcing means 20, 22, 24 and 26 such horseshoe-shaped cores are represented by the numerals 36, 38, 40 and 42 and their associated low inductance coils by the numberals 44, 46, 48 and 50, respectively. The structure and operation of each such switching means is the same. For example, to operate the switching means 20, current is applied to the coil 44. This generates a magnetic flux in the core member 36 flowing perpendicular to the highly permeable member comprisng the flux path 16 to saturate the region between the ends of the core member 36 substantially normal to the direction of flux flow from the magnet 10. This effectively opens the flux circuit means 16 to block the flux flow from the magnet through the switching means 20. When current ceases flowing in the coil 44, the magnetic flux flowing in the core 36 terminates to again return the switching means 20 and the flux path 16 to an effective closed circuit condition.

As previously indicated, the selective and alternating operation of the switching means 20, 22, 24 and 26 in accordance with the present invention causes the direction of flux flow in the core member 28 to be rapidly alternated thereby inducing an alternating current in the windings 30 and 32. In this regard, and as illustrated most clearly in FIG. 2, the core member 28 preferably comprises a pair of generally U-shaped elements 52 and 54 of highly permeable material carrying the windings 30 and 32 respectively, and having corresponding ends 56, 58 and 60, 62 bearing on opposite sides of the member comprising the flux paths 16 and 18 between the switching means 20 and 22, and between the switching means 24 and 26. Because of the high permeability of the elements 52 and 54 and the location of their end faces against the member comprising the flux paths 16 and 18, as the switching means are selectively and alternately operated, the core member 28 becomes a relatively low reluctance path for flux from the permanent magnet 10 between the north and south poles thereof.

The circuit means 34 for controlling the switching means and hence the direction of magnetic flux flow in the core member 28 is diagrammatically represented in FIG. 3 and comprises a source 64 of a high frequency alternating current control signal having its output connected in common to four parallel circuits connected to the coils 44, 46, 48 and 50 of the switching means 20, 22, 24 and 26, respectively. Each parallel circuit includes a diode or other unidirectional current conductive device illustrated at 66, 68, 70 and 72 for the parallel circuits associated with the switching means 20, 22, 24 and 26, respectively. The diodes 66 and 68 associated with the switching means 20 and 22 are poled in opposite directions as are the diodes 70 and 72 associated with the switching means 24 and 26. The diodes 66 and 72 and the diodes 68 and 70 being poled in like directions.

Thus, during a first or positive going half cycle of the control signal from the source 64, current flows through diodes 66 and 72 and the coils 44 and 50 while current is blocked by the diodes 68 and 70 from the coils 46 and 48. The current flowing in the coils 44 and 50 induces a magnetic flux in the associated core members 36 and 42 to saturate regions of the highly permeable member comprising the flux paths 16 and 18 and effectively blocks flux flow from the magnet beyond the switching means 20 and 26—there being a high reluctance in the region of the switching means and flux from the permanent magnet 10 following the path of lowest reluctance from the north pole 12 of the magnet through the flux path 18 and switching means 24 to a junction with the core member 28. Such a condition for the electromagnetic generator of the present invention is diagrammatically depicted in FIGS. 4(a) and 4(b), the cross at switching means 20 and 26 representing that they are in an effectively open condition.

As depicted in FIG. 4(b) at the junction of the path 18 and core member 28, the flux divides flowing upwardly in the elements 52 and 54 and joining at the junction of the core member 28 and the flux path 16 to flow through the flux path 16, the switching means 22, and to the south pole 14 of the magnet. Such flux flow in the core member 28 induces a current in a first direction in the windings 30 and 32.

During a second or negative going half cycle of the alternating control signal from the source 64, current only passes through the diodes 68 and 70 to flow through the coils 46 and 48. Such current flow produces a cross saturation of the highly permeable member comprising the flux paths 16 and 18 in the regions of the switching means 22 and 24 to effectively open such portions of the flux paths. Under such conditions and as illustrated diagrammatically in FIGS. 5(a) and 5(b), magnetic flux from the permanent magnet 10 following the path of lowest reluctance flows upwardly in the flux path 16 through the switching means 20 to a junction of the core member 28. There, the magnetic flux divides and flows downwardly through the elements 52 and 54 to join at a junction of the flux path 18. Flux then continues to flow in the flux path 18 to the south pole 14 of the magnet 10. Such flux flow in the elements 50 and 52 of the core member 38 induces a current in the windings 30 and 32 flowing in an opposite direction to that induced during the positive-going half cycle of the control signal from the source 64. Thus, during alternate half cycles of the control signal, relative negative and positive going signals are induced in the windings 30 and 32 to produce an alternating current for application to a load circuit connected to the windings.

By use of core members of highly permeable material and low inductance coils in the switching means of the present invention, the necessary cross saturation to effect an opening of the flux paths 16 and 18 on an alternating and high frequency basis may be accomplished using low magnitude control signals. Yet, by using a strong permanent magnet, the induced alternating current generated by a alternating of the direction of magnetic flux in the core member 28 is of a relatively high magnitude. Further, the more rapid or the greater the frequency of the control signal, the higher the frequency of alternation of the direction of flux flow in the core member to produce an alternating current in the windings 30 and 32 of increased magnitude.

In view of the foregoing, it is to be appreciated that the present invention provides a simple electromagnetic generator for converting magnetic to electrical energy by rapidly alternating the direction of magnetic flux flow in a core member. This is accomplished in a manner such that as the frequency of the operation of the means for controlling flux flow direction increases the magnitude of the induced alternating current also increases.

While a particular form of electromagnetic generator has been described in some detail herein, changes and modifications may be made without parting from the spirit of the invention. Accordingly, it is intended that the present invention be limited in scope only by the terms of the following claims.

I claim:

1. An electromagnetic generator comprising:
   a permanent magnet having a north and a south pole;
   first and second magnetic flux circuit means each including a highly permeable member between said north and south poles external to said permanent magnet;
   first and second core members associated with each of said first and second magnetic flux circuit means and each including means for saturating a region of the highly permeable member of said associated flux circuit substantially normal to the direction of flux flow in said highly permeable member to selectively block flux flow from said magnet in said associated highly permeable member;
   a third core member composed of a highly permeable material connected at opposite ends to said first and second magnetic flux circuit means between said first and second core members respectively;
   a winding of electrically conductive material on said third core member for connection to an external load circuit; and
   means for alternately operating said first core member and said second core member of said first and second flux circuit means respectively, and said second core member and said first core member of said first and second flux circuit means respectively whereby the direction of magnetic flux in said third core member from said permanent magnet is rapidly alternated to generate an alternating current in said winding for application to said load circuit.

2. The electromagnetic generator of claim 1 wherein each of said means for saturating a region of said highly permeable members include a horseshoe-shaped core with ends on opposite sides of said highly permeable member and carrying a low inductance coil.

3. The electromagnetic generator of claim 2 wherein the means for saturating a region of said highly permeable members includes:
   a source of high frequency alternating current; and
   circuit means for passing said high frequency alternating current through said coils associated with said first core member and second core member of said first and second flux circuit means respectively, and said second core member and first core member of said first and second flux circuit means respectively during alternate half-cycles of said current.

4. The electromagnetic generator of claim 1 wherein:
   said third core member includes a pair of elements of highly permeable material having corresponding ends on opposite sides said highly permeable members comprising said first and second magnetic flux circuit means between said first and second core members thereof respectively;
   said winding is on a first one of said pair of elements; and
   said generator includes a second winding on a second one of said pair of elements in circuit with said first mentioned winding and said external load.

* * * * *